United States Patent
Balasubramanian et al.

(10) Patent No.: US 11,677,736 B2
(45) Date of Patent: Jun. 13, 2023

(54) TRANSIENT IDENTIFICATION GENERATION

(71) Applicant: International Business Machines Corporation, Armonk, NY (US)

(72) Inventors: Swaminathan Balasubramanian, Troy, MI (US); Thomas G. Lawless, III, Wallkil, NY (US); Jason Malinowski, Mahopac, NY (US); Genevieve van den Boer, Richmond (CA); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 17/211,961

(22) Filed: Mar. 25, 2021

(65) Prior Publication Data
US 2022/0311758 A1  Sep. 29, 2022

(51) Int. Cl.
*H04L 9/40* (2022.01)
*G06N 7/00* (2023.01)
(Continued)

(52) U.S. Cl.
CPC .............. *H04L 63/08* (2013.01); *G06F 9/542* (2013.01); *G06N 7/00* (2013.01); *H04L 63/102* (2013.01);
(Continued)

(58) Field of Classification Search
CPC ... H04L 63/08; H04L 63/102; H04L 63/0861; H04L 63/0414; H04L 63/0853;
(Continued)

(56) References Cited

U.S. PATENT DOCUMENTS 5,991,758 A  11/1999  Ellard
6,094,643 A   7/2000  Anderson
(Continued)

FOREIGN PATENT DOCUMENTS

WO  2017213719 A1  12/2017

OTHER PUBLICATIONS

Authors et al., "System and Methods for automated, controlled situational personal information distribution ("This Is I")", An IP.com Prior Art Database Technical Disclosure, IP.com No. IPCOM000018965D, IP.com Electronic Publication Date: Aug. 22, 2003, 7 pages.

(Continued)

*Primary Examiner* — Aravind K Moorthy
(74) *Attorney, Agent, or Firm* — Michael O'Keefe

(57) ABSTRACT

In an approach to transient identification generation, one or more computer processors receive a request for one or more identification artifacts associated with a user from a requesting entity. One or more computer processors determine a first set of identification artifacts. One or more computer processors transmit the first set of identification artifacts to the requesting entity. One or more computer processors determine whether the first set of identification artifacts is an approved response to the request for the one or more identification artifacts. In response to determining the first set of identification artifacts is the approved response to the request for the one or more identification artifacts, one or more computer processors generate a transient identification that includes the first set of identification artifacts. One or more computer processors transmit the transient identification to the requesting entity.

20 Claims, 3 Drawing Sheets

(51) Int. Cl.
  *G06F 9/54* (2006.01)
  *G06Q 50/26* (2012.01)
  *G06Q 20/36* (2012.01)
(52) U.S. Cl.
  CPC ......... *G06Q 20/363* (2013.01); *G06Q 50/265* (2013.01)
(58) Field of Classification Search
  CPC .............. G06F 9/542; G06F 21/6245; G06F 16/24578; G06N 7/00; G06N 5/022; G06N 20/00; G06Q 20/363; G06Q 50/265
  See application file for complete search history.

(56) References Cited

U.S. PATENT DOCUMENTS

| | | | |
|---|---|---|---|
| 6,854,642 B2 | 2/2005 | Metcalf | |
| 7,085,924 B2 | 8/2006 | Bahl | |
| 7,988,043 B2 | 8/2011 | Davis | |
| 8,127,136 B2 | 2/2012 | Yun | |
| 8,386,377 B1 | 2/2013 | Xiong | |
| 8,678,273 B2 | 3/2014 | Mcneal | |
| 9,202,052 B1* | 12/2015 | Fang | G06F 21/552 |
| 9,245,121 B1* | 1/2016 | Luo | H04L 63/14 |
| 9,330,390 B2 | 5/2016 | Pitroda | |
| 9,361,624 B2 | 6/2016 | Spears | |
| 9,406,067 B1 | 8/2016 | Robinson | |
| 9,594,968 B1* | 3/2017 | Hodgman | G06V 40/50 |
| 9,721,147 B1 | 8/2017 | Kapczynski | |
| 9,954,685 B2 | 4/2018 | Redpath | |
| 10,032,042 B1 | 7/2018 | Eckel | |
| 10,057,768 B1* | 8/2018 | Furuichi | H04L 63/045 |
| 10,375,119 B2 | 8/2019 | Aronowitz | |
| 10,453,159 B2 | 10/2019 | Kapczynski | |
| 10,459,953 B1* | 10/2019 | Ji | G06Q 50/01 |
| 10,554,616 B1* | 2/2020 | Teodosiu | H04L 63/168 |
| 10,715,519 B1* | 7/2020 | Slaby | H04W 4/00 |
| 10,728,116 B1* | 7/2020 | Chawla | H04L 41/5064 |
| 10,755,265 B1 | 8/2020 | Laureano-Osorio | |
| 10,902,405 B1* | 1/2021 | Maeng | G06Q 20/3224 |
| 10,902,705 B1 | 1/2021 | Rose | |
| 10,924,514 B1 | 2/2021 | Altman | |
| 10,944,561 B1 | 3/2021 | Cahill | |
| 11,151,481 B1 | 10/2021 | Sun | |
| 11,163,898 B2* | 11/2021 | Borenstein | G06F 16/176 |
| 11,290,687 B1 | 3/2022 | Becchetti | |
| 11,343,080 B1* | 5/2022 | Bagley | G06F 21/31 |
| 11,397,745 B1 | 7/2022 | Hemingway | |
| 2002/0029279 A1 | 3/2002 | Campbell | |
| 2002/0083008 A1 | 6/2002 | Smith | |
| 2003/0139961 A1* | 7/2003 | Arguello | G06Q 10/04 705/7.14 |
| 2004/0049401 A1 | 3/2004 | Carr | |
| 2006/0149674 A1 | 7/2006 | Cook | |
| 2006/0282660 A1 | 12/2006 | Varghese | |
| 2007/0011153 A1* | 1/2007 | Pillai | G06Q 30/00 707/999.005 |
| 2007/0055887 A1 | 3/2007 | Cross | |
| 2007/0136573 A1 | 6/2007 | Steinberg | |
| 2009/0100275 A1* | 4/2009 | Chang | H02J 7/00 713/300 |
| 2009/0287579 A1* | 11/2009 | Walker | G06Q 40/02 705/44 |
| 2010/0050233 A1 | 2/2010 | Ross | |
| 2012/0158657 A1* | 6/2012 | Bernstein | G06F 8/71 707/634 |
| 2012/0198559 A1* | 8/2012 | Venkata Naga Ravi | G06F 21/62 726/26 |
| 2013/0067547 A1 | 3/2013 | Thavasi | |
| 2015/0071438 A1* | 3/2015 | Lambert | H04W 12/50 709/227 |
| 2015/0081538 A1 | 3/2015 | Renard | |
| 2016/0063227 A1 | 3/2016 | Kobres | |
| 2016/0086166 A1 | 3/2016 | Pomeroy | |
| 2016/0092557 A1 | 3/2016 | Stojanovic | |
| 2016/0255082 A1* | 9/2016 | Rathod | G06Q 50/01 726/1 |
| 2016/0275636 A1* | 9/2016 | Olenick | G06F 3/04842 |
| 2016/0315926 A1* | 10/2016 | Agarwal | H04L 63/06 |
| 2017/0046426 A1* | 2/2017 | Pearce | G06F 16/334 |
| 2017/0154310 A1* | 6/2017 | Duerr | G06Q 10/1053 |
| 2017/0185762 A1* | 6/2017 | Chang | G06F 21/32 |
| 2017/0262164 A1* | 9/2017 | Jain | G06F 9/451 |
| 2017/0287049 A1* | 10/2017 | Li | G06Q 50/01 |
| 2017/0372049 A1* | 12/2017 | Tieu | G06F 21/32 |
| 2017/0372185 A1 | 12/2017 | Friant | |
| 2017/0374070 A1* | 12/2017 | Shah | H04L 63/0884 |
| 2018/0082360 A1* | 3/2018 | Lee | G06Q 30/0643 |
| 2018/0139195 A1* | 5/2018 | Isaacson | H04W 12/63 |
| 2018/0173649 A1* | 6/2018 | Kyrychynskyi | G06F 13/161 |
| 2018/0288037 A1 | 10/2018 | Yang | |
| 2018/0308190 A1 | 10/2018 | Marco | |
| 2019/0045331 A1* | 2/2019 | Liang | G06N 20/20 |
| 2019/0102801 A1* | 4/2019 | Lee | G06Q 30/0267 |
| 2019/0139035 A1* | 5/2019 | Mittal | G06Q 20/3226 |
| 2019/0163912 A1* | 5/2019 | Kumar | H04L 41/08 |
| 2019/0197621 A1* | 6/2019 | Sand | G06Q 40/06 |
| 2019/0228078 A1* | 7/2019 | Tucker | H04L 67/1097 |
| 2019/0244362 A1* | 8/2019 | Movshovitz-Attias | G06T 7/136 |
| 2019/0251562 A1 | 8/2019 | Dabiri | |
| 2019/0258499 A1* | 8/2019 | Annapragada | G06F 8/63 |
| 2019/0272361 A1* | 9/2019 | Kursun | H04L 67/535 |
| 2019/0295006 A1 | 9/2019 | Zises | |
| 2020/0051112 A1* | 2/2020 | Nelsen | G06Q 40/06 |
| 2020/0112552 A1* | 4/2020 | McGee | H04L 51/046 |
| 2020/0226600 A1 | 7/2020 | Cao | |
| 2020/0257514 A1* | 8/2020 | Gadgil | H04L 67/34 |
| 2020/0293974 A1* | 9/2020 | Kaura | G06Q 10/1053 |
| 2020/0358614 A1* | 11/2020 | Fiske | H04L 9/3252 |
| 2020/0374129 A1* | 11/2020 | Dilles | H04L 9/3247 |
| 2020/0394127 A1* | 12/2020 | Hicks | G06F 11/3692 |
| 2021/0012254 A1* | 1/2021 | Campbell | G06Q 30/0185 |
| 2021/0057077 A1* | 2/2021 | Neumann | G16H 20/60 |
| 2021/0065267 A1 | 3/2021 | Smith | |
| 2021/0240681 A1* | 8/2021 | Algranati | G06F 16/215 |
| 2021/0271650 A1* | 9/2021 | Wang | G06F 16/174 |
| 2021/0374146 A1* | 12/2021 | Hrastnik | G06F 16/2343 |
| 2021/0397462 A1* | 12/2021 | Chenguttuvan | G06N 5/003 |
| 2021/0406904 A1 | 12/2021 | Ravinathan | |
| 2022/0020388 A1* | 1/2022 | Trim | G10L 25/84 |
| 2022/0138170 A1* | 5/2022 | Misiewicz | G06N 3/0454 707/737 |
| 2022/0236904 A1* | 7/2022 | Miller | G06F 3/0673 |
| 2022/0284242 A1* | 9/2022 | Kim | G06F 11/3438 |
| 2022/0294655 A1* | 9/2022 | Brickner | G06F 16/9035 |

OTHER PUBLICATIONS

Anonymously, "System and Methods for Automated, Controlled Situational Personal Information Distribution ("This is I")," ip.com, ip.com No. IPCOM000018965D, Aug. 22, 2003, 7 Pages.

Balasubramanian et al., "Identifying Alternative Set of Digital ID Documents Used to Verify User Meets ID Requirements for an Associated Activity or Event", US IBM U.S. Appl. No. 17/555,689, filed Dec. 20, 2021, 55 Pages.

Castro et al., "Runtime Adaptive Multi-Factor Authentication for Mobile Devices," IBM Journal of Research and Development, vol. 57, No. 6, Paper No. 8, 2013, 17 Pages.

Chen et al. "Privwatcher: Non-bypassable monitoring and protection of process credentials from memory corruption attacks." Proceedings of the 2017 ACM on Asia Conference on Computer and Communications Security, 2017, 12 Pages.

IBM Appendix P, "List of patent and patent applications treated as related", Filed Herewith, 2 pages.

Malinowski et al., "Identifying Suspicious Behavior Based on Patterns of Digital Dentification Documents", US IBM U.S. Appl. No. 17/555,883, filed Dec. 20, 2021, 57 Pages.

(56) References Cited

OTHER PUBLICATIONS

Ryutov et al., "Adaptive Trust Negotiation and Access Control," ACM Symposium on Access Control Models and Technologies, Stockholm, Sweden, Jun. 1-3, 2005, 8 Pages.
Sanzi et al., "Integrating Trust Profiles, Trust Negotiation, and Attribute Based Access Control," 5th IEEE International Conference on Mobile Cloud Computing, Services, and Engineering, 2017, 8 Pages.

* cited by examiner

TRANSIENT IDENTIFICATION GENERATION

BACKGROUND OF THE INVENTION

The present invention relates generally to the field of personal information security, and more particularly to transient identification generation.

With the proliferation of technology and the rapid integration of nearly every commercial industry, financial institution, educational organization, and government agency with the World Wide Web, it has become increasingly difficult for individuals to protect their identities. Identity theft is rampant, and yet individuals are asked to provide personal identification information to service providers or to security personnel to gain access to particular locations or activities, without any guarantee of the security of their information. Further, individuals are often requested to provide more personal information than is actually required to verify who they are, both over the internet and in everyday in-person transactions. Conversely, service providers, vendors, security personnel, etc., would like as much assurance as possible that individuals are who they claim to be.

Personal information can include any information that can be used to distinguish or trace the identity of an individual, such as name, social security number, date and place of birth, mother's maiden name, or biometric records. Personal information can also include any other information that is linked or linkable to an individual, such as medical, educational, financial, and employment information.

SUMMARY

Embodiments of the present invention disclose a computer-implemented method, a computer program product, and a system for transient identification generation. The computer-implemented method may include one or more computer processors receiving a request for one or more identification artifacts associated with a user from a requesting entity. One or more computer processors determine a first set of identification artifacts. One or more computer processors transmit the first set of identification artifacts to the requesting entity. One or more computer processors determine whether the first set of identification artifacts is an approved response to the request for the one or more identification artifacts. In response to determining the first set of identification artifacts is the approved response to the request for the one or more identification artifacts, one or more computer processors generate a transient identification that includes the first set of identification artifacts. One or more computer processors transmit the transient identification to the requesting entity.

DETAILED DESCRIPTION

In many daily situations, there is a need for a person to provide identification, such as a driver's license, to an entity to complete a transaction. The identification may include more information than is required to complete the transaction. For example, a purchase at a store may require age verification, so year of birth may be sufficient. In another example, when picking up a parcel, name and address is sufficient. In a further example, when booking a flight, a name and passport number is sufficient. Unfortunately, communicating the personal identification artifacts often requires a person to hand over a physical form of identification with multiple fields, all of which are then shared with the requesting entity. There is no way to limit the fields that are shared with the entity in the transaction.

Embodiments of the present invention recognize that privacy security may be improved by providing a method that enables digital identification negotiation to reduce the number of identification artifacts shared in public situations. Embodiments of the present invention also recognizes that using pre-existing digital identification artifacts held by the user with user-configured options, or in response to contextual situations, presenting a minimal set of digital identification artifacts can be sufficient to meet the needs of a requesting entity. Further, embodiments of the present invention recognize that enabling a negotiation between the user and the requesting entity for the minimum set of required identification artifacts both protects the privacy of the user and streamlines the transaction for the requesting entity. Implementation of embodiments of the invention may take a variety of forms, and exemplary implementation details are discussed subsequently with reference to the Figures.

Figure 1:
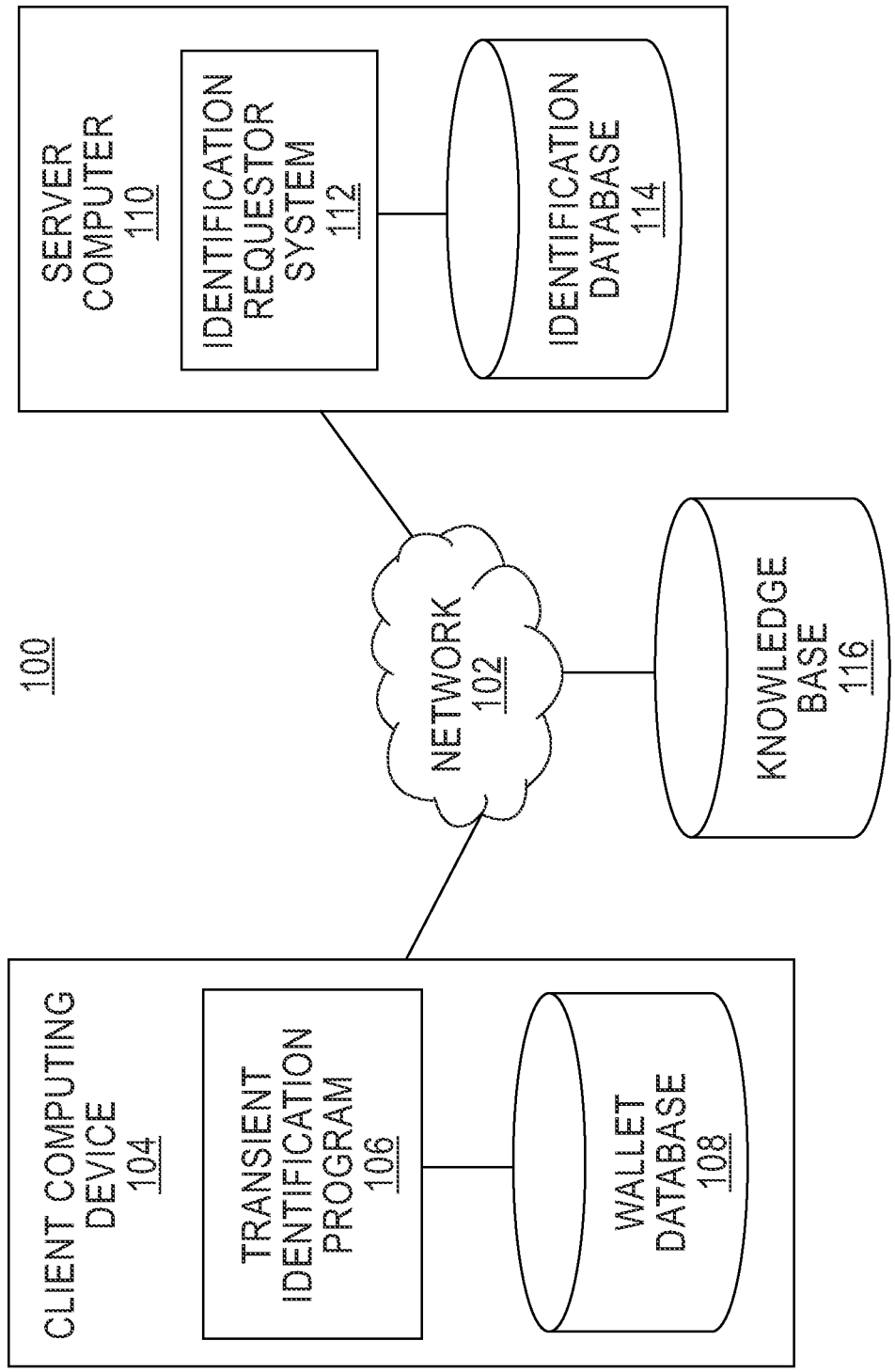
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Client computing device 104 can be one or more of a laptop computer, a tablet computer, a smart phone, smart watch, a smart speaker, or any programmable electronic device capable of communicating with various components and devices within distributed data processing environment 100, via network 102. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 104 may be integrated into a vehicle of the user. For example, client computing device 104 may include a heads-up display in the windshield of the vehicle. In general, client computing device 104 represents one or more programmable electronic devices or combination of programmable electronic devices capable of executing machine readable program instructions and communicating with other computing devices (not shown) within distributed data processing environment 100 via a network, such as network 102. Client computing device 104 includes transient identification program 106 and wallet database 108. Client computing device 104 may include internal and external hardware components, as depicted and described in further detail with respect to FIG. 3.

Transient identification program 106 reduces sharing of digital identification artifacts to the minimum required for a specific situation. Transient identification program 106 enables a user to control identification artifacts such that the user can share the artifacts selectively with trusted entities. In addition, transient identification program 106 aides a requesting entity with receiving the minimum required identification, as well as encouraging the entity to be selective with which identification artifacts the entity requests. In an embodiment, transient identification program 106 includes a user interface that enables the user to input identification artifacts and associated preferences. Transient identification program 106 receives a trigger of a situation that requires a user to share identification. Transient identification program 106 receives a request for one or more identification artifacts from identification requestor system 112. Transient identification program 106 determines a set of artifacts. Transient identification program 106 transmits the set of artifacts to identification requestor system 112. Transient identification program 106 determines if identification requestor system 112 approves the transmitted set of artifacts. If identification requestor system 112 does not approve, then transient identification program 106 determines a new set of artifacts and transmits the new set of artifacts to identification requestor system 112. Responsive to receiving approval, transient identification program 106 generates a transient identification. Transient identification program 106 transmits the transient identification to identification requestor system 112. Transient identification program 106 is depicted and described in further detail with respect to FIG. 2.

Wallet database 108 stores information used by transient identification program 106. In the depicted environment, wallet database 108 resides on client computing device 104, ensuring privacy of identification details for the user by being stored locally. In another embodiment, wallet database 108 may reside elsewhere within distributed data processing environment 100 provided that transient identification program 106 has access to wallet database 108 and provided that wallet database is a private database, accessible only by transient identification program 106 and the user of client computing device 104. A database is an organized collection of data. Wallet database 108 can be implemented with any type of storage device capable of storing data and configuration files that can be accessed and utilized by transient identification program 106, such as a database server, a hard disk drive, or a flash memory. Wallet database 108 represents one or more databases that store identification artifacts of the user of client computing device 104. An identification artifact represents a unique piece of information that is associated with the user and, in some way, distinctly identifies the user. For example, identification artifacts may include a date of birth, an age, a physical attribute, a street address, a phone number, an email address, a driver's license number, a passport number, a social security number, a signature, an image of the user, a fingerprint, an employer, a job role, an employee identification number, a loyalty membership number, insurance information, a credit card number, a bank account number, financial information, medical information (e.g., allergies, medications, vaccinations), biographical information (e.g., schools attended, previous addresses, interests, hobbies, languages spoken), biometric information, etc. Wallet database 108 may also store user preferences associated with scenarios and/or locations in which the user decides to share or not share one or more identification artifacts. For example, the user may set a preference indicating a passport number can be shared at the airport but not at the grocery store. Wallet database 108 may also store user preferences for an order or priority of identification artifacts that the user is willing to share when multiple equivalent artifacts may be used.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 110 represents a computing system utilizing clustered computers and components (e.g., database server computers, application server computers, etc.) that act as a single pool of seamless resources when accessed within distributed data processing environment 100. Server computer 110 includes identification requestor system 112 and identification database 114.

Identification requestor system 112 represents one or more gatekeeper entities responsible for determining if the user of client computing device 104 meets identification requirements for an associated activity or event. For example, identification requestor system 112 may be a system at an airport that requests and verifies user identification such as a driver's license or a passport.

Identification database 114 stores information used by transient identification program 106 and identification requestor system 112. In the depicted embodiment, identification database 114 resides on server computer 110. In another embodiment, identification database 114 may reside elsewhere within distributed data processing environment 100, provided that transient identification program 106 and identification requestor system 112 have access to identification database 114. A database is an organized collection of data. Identification database 114 can be implemented with any type of storage device capable of storing data and configuration files that can be accessed and utilized by transient identification program 106, such as a database server, a hard disk drive, or a flash memory. Identification database 114 stores identification artifacts received with consent from one or more users of identification requestor system 112.

Knowledge base 116 stores information used by transient identification program 106. In the depicted embodiment, knowledge base 116 resides in distributed data processing environment 100. In another embodiment, knowledge base 116 may reside on client computing device 104 to provide a local copy of cloud data. A database is an organized collection of data. Knowledge base 116 can be implemented with any type of storage device capable of storing data and configuration files that can be accessed and utilized by transient identification program 106, such as a database server, a hard disk drive, or a flash memory. Knowledge base 116 stores data associated with various identification requirements based on location, agency, business type, local laws, regulations, etc. For example, knowledge base 116 stores information associated with identification requirements of an airport.

The present invention may contain various accessible data sources, such as wallet database 108, identification database 114, and knowledge base 116, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Transient identification program 106 enables the authorized and secure processing of personal data. Transient identification program 106 provides informed consent, with notice of the collection of personal data, enabling the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Transient identification program 106 provides information regarding personal data and the nature (e.g., type, scope, purpose, duration, etc.) of the processing. Transient identification program 106 provides the user with copies of stored personal data. Transient identification program 106 enables the correction or completion of incorrect or incomplete personal data. Transient identification program 106 enables the immediate deletion of personal data.

Figure 2:
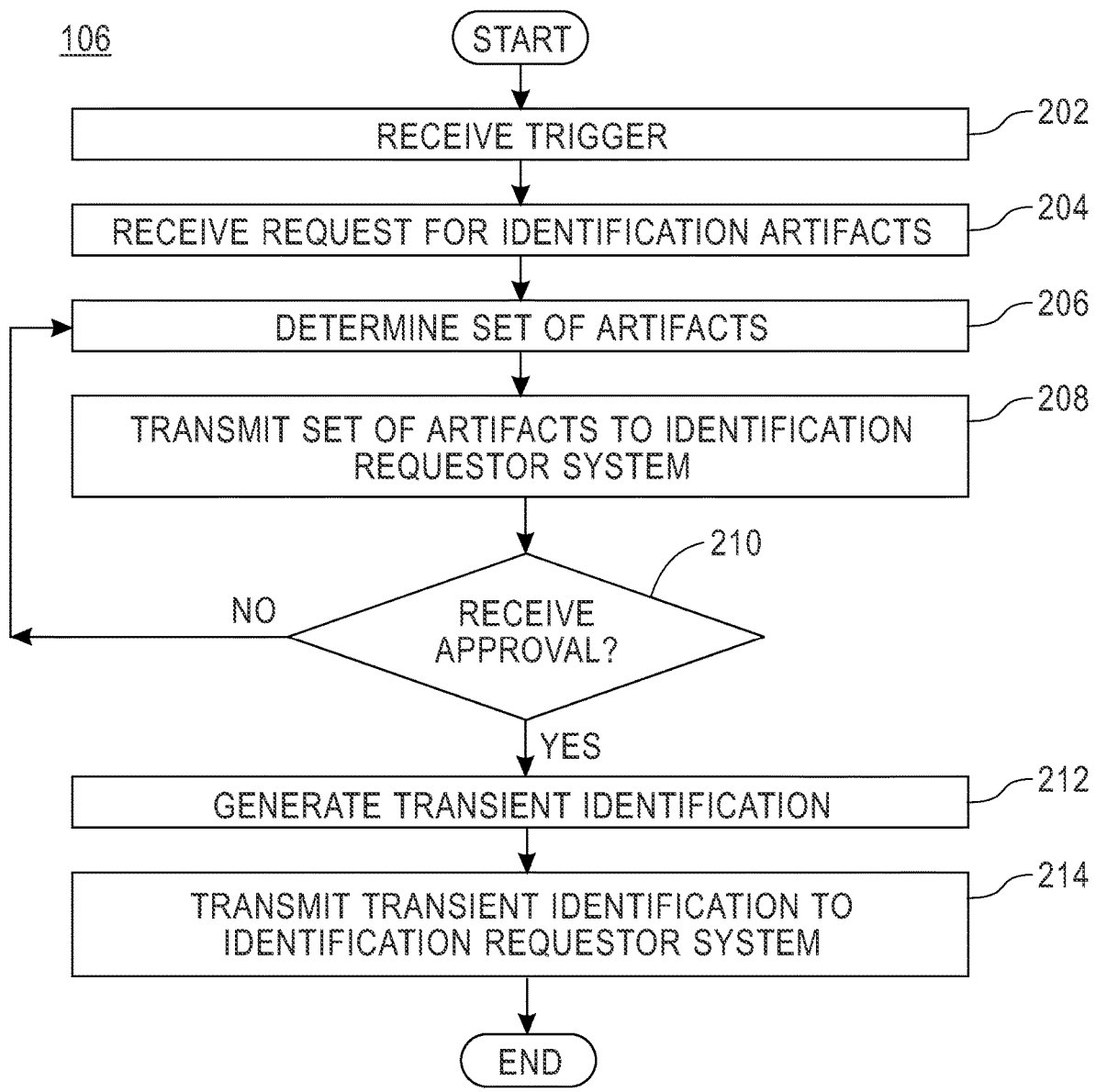
FIG. 2 is a flowchart depicting operational steps of a transient identification program, on a client computing device within the distributed data processing environment of FIG. 1, for transient identification generation, in accordance with an embodiment of the present invention.

FIG. 2 is a flowchart depicting operational steps of transient identification program 106, on client computing device 104 within distributed data processing environment 100 of FIG. 1, for transient identification generation, in accordance with an embodiment of the present invention.

Transient identification program 106 receives a trigger (step 202). In an embodiment, transient identification program 106 receives a trigger to start processing a transient identification (ID) when a user initiates transient identification program 106. For example, if transient identification program 106 is mobile application software, or an "app," installed on client computing device 104, then the user can trigger transient identification program 106 by opening the app. In another embodiment, transient identification program 106 receives a trigger based on a contextual situation or scenario. For example, transient identification program 106 may determine the geolocation of client computing device 104 using one or more known techniques, such as global positioning service (GPS) coordinates. Then, transient identification program 106 maps the geolocation to a physical location or place of business, such as an airport, train station, government building, grocery store, etc. Transient identification program 106 compares the location to data stored in knowledge base 116 to determine whether an ID validation may be required in the context of the location.

Transient identification program 106 receives a request for identification artifacts (step 204). In an embodiment, transient identification program 106 establishes communication with identification requestor system 112 at the geolocation using one or more known techniques. For example, transient identification program 106 may use techniques such as Bluetooth®, cellular, near field communication (NFC), or one or more other techniques to establish communication with identification requestor system 112. In an embodiment, after establishing communication, transient identification program 106 receives a request for identification of the user from identification requestor system 112. In an embodiment, the request includes a set of one or more distinct identification artifacts required by identification requestor system 112.

Transient identification program 106 determines a set of artifacts (step 206). In an embodiment, transient identification program 106 identifies one or more identification artifacts stored in wallet database 108 that will meet the requirements of the request for identification artifacts. In one embodiment, transient identification program 106 uses a selection algorithm to determine the set of artifacts to which the user consents to provide. The selection algorithm uses a machine learning model that computes the minimum required subset of identification artifacts based on time series historic data. For example, transient identification program 106 may use a modified Jaccard distance scoring function to sort and select a set of equivalent identification artifacts from wallet database 108. In the example, the following artifacts are available: A, B, C, D, W, $\underline{X}$, Y, $\underline{Z}$, Q. The user has designated, via preferences stored in wallet database 108, that the user does not want to share $\underline{X}$ or $\underline{Z}$ in this location. Q is an artifact with a Time to Live (TTL), i.e., an expiration date or time, for which Q is not valid outside of a specified window. In an embodiment, transient identification program 106 retrieves historical data from identification database 114 associated with previous users who successfully met the requirements of identification requestor system 112. In another embodiment, transient identification program 106 retrieves historical data from wallet database 108. In yet another embodiment, transient identification program 106 retrieves historical data from knowledge base 116 or elsewhere in distributed data processing environment 100. In an embodiment, the selection algorithm is an integrated component of transient identification program 106. In another embodiment, the selection algorithm resides elsewhere within distributed data processing environment 100, and transient identification program 106 utilizes the selection algorithm via network 102.

Transient identification program 106 may also retrieve data from identification database 114 that is associated with the location of identification requestor system 112 and/or the type of transaction for which the identification is being requested. Transient identification program 106 finds one or more previous users with combinations of identification artifacts that match the set of the user of client computing device 104, i.e., A, B, C, D, W, $\underline{X}$, Y, $\underline{Z}$, Q, and match the defined constraints, i.e., the preference to not share $\underline{X}$ or $\underline{Z}$ and the TTL of Q. Transient identification program 106 uses the modified Jaccard distance scoring function to remove $\underline{X}$ and $\underline{Z}$ from the intersection but leave them in the union. Doing so automatically forces combinations with $\underline{X}$ and $\underline{Z}$ to score lower. Further, the modified Jaccard distance scoring function excludes Q if the TTL indicates the artifact has expired. The modified Jaccard distance scoring function computes a distance function for previous users of identification requestor system 112 and ranks the identification artifacts to find a "best fit" alternate set of artifacts to meet the request. The modified Jaccard distance scoring function returns the highest matching scoring set of identification artifacts to transient identification program 106.

Transient identification program 106 transmits the set of artifacts to identification requestor system 112 (step 208). In an embodiment, in response to the request for identification artifacts, transient identification program 106 transmits the determined set of artifacts to identification requestor system 112. The transmitted set of artifacts may be an exact match to the requested set of artifacts. However, the transmitted set of artifacts may be only a subset of the requested set of artifacts or a different combination of artifacts than the artifacts included in the request. Transient identification program 106 transmits a set of artifacts that both meet the requirements of the request and satisfies the user's preferences to not share certain artifacts. In an embodiment, the set of artifacts is a list of identification artifacts, but not the artifacts themselves, that transient identification program 106 proposes to identification requestor system 112 as means to fulfill the request for artifacts.

Transient identification program 106 determines whether identification requestor system 112 approved the set of artifacts (decision block 210). In an embodiment, by transmitting the set of artifacts to identification requestor system 112, transient identification program 106 begins a negotiation cycle with identification requestor system 112 associated with which identification artifacts fulfill the requirements of the request and are, therefore, an approved response to the request. While in negotiation, transient identification program 106 determines if identification requestor system 112 approves of the transmitted set of identification artifacts. In an embodiment, transient identification program 106 stores the result of the negotiation, i.e., whether or not identification requestor system 112 approved the set of artifacts, as historical data for use by the selection algorithm. In an embodiment, transient identification program 106 stores the result of the negotiation in wallet database 108. In another embodiment, transient identification program 106 stores the result of the negotiation in identification database 114. In another embodiment, transient identification program 106 stores the result of the negotiation elsewhere in distributed data processing environment 100.

If transient identification program 106 determines identification requestor system 112 did not approve the set of artifacts ("no" branch, decision block 210), then transient identification program 106 returns to step 206 to determine a second set of identification artifacts. In an embodiment, if identification requestor system 112 does not approve of the proposed set of artifacts, transient identification program 106 receives reasoning and/or suggestions from identification requestor system 112 to assist in determining a second set of artifacts which both fulfills the request and protects the user's privacy by only including a minimum number of identification artifacts that meets the user's pre-configured preferences.

If transient identification program 106 determines identification requestor system 112 approved the set of artifacts ("yes" branch, decision block 210), then transient identification program 106 generates a transient identification (step 212). In an embodiment, transient identification program 106 generates a transient, i.e., a one-time-use, ID that includes the approved set of identification artifacts. In an embodiment, transient identification program 106 encodes the artifacts prior to transmitting the artifacts. For example, transient identification program 106 may use blockchain technology to encode the set of artifacts. In another example, transient identification program 106 may use digital signatures applied by the user to each identification artifact to encode the set of artifacts. By encoding the set of artifacts in the transient ID, transient identification program 106 ensures privacy for the user.

Transient identification program 106 transmits the transient identification to identification requestor system 112 (step 214). In an embodiment, transient identification program 106 transmits the generated transient ID to identification requestor system 112 to enable the transaction for which identification was requested and for which the user is attempting to complete. In an embodiment, transient identification program 106 stores the transient ID in identification database 114. In another embodiment, in response to receiving the transient ID, identification requestor system 112 stores the transient ID in identification database 114.

Figure 3:
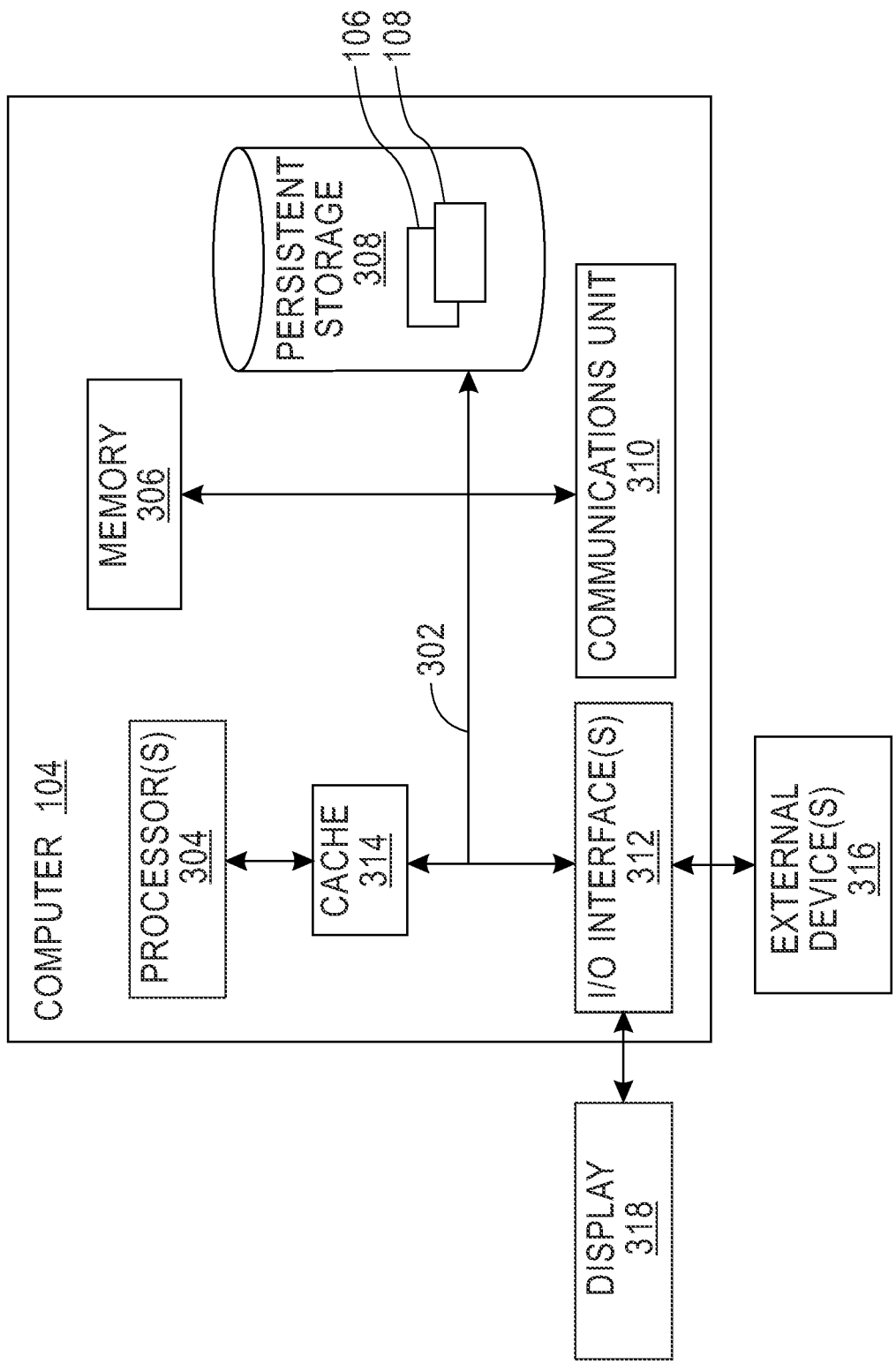
FIG. 3 depicts a block diagram of components of the client computing device executing the transient identification program within the distributed data processing environment of FIG. 1, in accordance with an embodiment of the present invention.

FIG. 3 depicts a block diagram of components of client computing device 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Client computing device 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., transient identification program 106 and wallet database 108, are stored in persistent storage 308 for execution and/or access by one or more of the respective processor(s) 304 of client computing device 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of server computer 110. In these examples, communications unit 310 includes one or more network interface cards. Communications unit 310 may provide communications through the use of either or both physical and wireless communications links. Transient identification program 106, wallet database 108, and other programs and data used for implementation of the present invention, may be downloaded to persistent storage 308 of client computing device 104 through communications unit 310.

I/O interface(s) 312 allows for input and output of data with other devices that may be connected to client computing device 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., transient identification program 106, wallet database 108, on client computing device 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, a request for one or more identification artifacts associated with a user from a requesting entity;
   determining, by one or more computer processors, a first set of identification artifacts, wherein the first set of identification artifacts is a list of one or more types of identification artifacts that meet the requirements of the request and satisfy a preference of the user;
   transmitting, by one or more computer processors, the first set of identification artifacts to the requesting entity;
   determining, by one or more computer processors, whether the first set of identification artifacts is an approved response to the request for the one or more identification artifacts;
   responsive to determining the first set of identification artifacts is the approved response to the request for the one or more identification artifacts, generating, by one or more computer processors, a transient identification of the user that includes the first set of identification artifacts; and
   transmitting, by one or more computer processors, the transient identification to the requesting entity.

2. The computer-implemented method of claim 1, further comprising:
   receiving, by one or more computer processors, a trigger to start processing the transient identification.

3. The computer-implemented method of claim 2, wherein receiving the trigger to start processing the transient identification includes at least one of receiving initiation of the processing from the user and receiving a trigger based on a contextual situation or scenario.

4. The computer-implemented method of claim 1, further comprising:
   responsive to determining the first set of identification artifacts is not the approved response to the request for the one or more identification artifacts, determining, by one or more computer processors, a second set of identification artifacts; and
   transmitting, by one or more computer processors, the second set of identification artifacts to the requesting entity.

5. The computer-implemented method of claim 1, wherein an identification artifact is a unique piece of information that is associated with the user and distinctly identifies the user.

6. The computer-implemented method of claim 1, wherein determining the first set of identification artifacts further comprises:
   using, by one or more computer processors, a selection algorithm.

7. The computer-implemented method of claim 6, wherein the selection algorithm is a Jaccard distance scoring function, and wherein the Jaccard distance scoring function is modified to match one or more defined constraints.

8. A computer program product comprising:
   one or more computer readable storage devices and program instructions collectively stored on the one or more computer readable storage devices, the stored program instructions comprising:
   program instructions to receive a request for one or more identification artifacts associated with a user from a requesting entity;
   program instructions to determine a first set of identification artifacts, wherein the first set of identification artifacts is a list of one or more types of identification artifacts that meet the requirements of the request and satisfy a preference of the user;
   program instructions to transmit the first set of identification artifacts to the requesting entity;
   program instructions to determine whether the first set of identification artifacts is an approved response to the request for the one or more identification artifacts;
   responsive to determining the first set of identification artifacts is the approved response to the request for the one or more identification artifacts, program instructions to generate a transient identification of the user that includes the first set of identification artifacts; and
   program instructions to transmit the transient identification to the requesting entity.

9. The computer program product of claim 8, the stored program instructions further comprising:
   program instructions to receive a trigger to start processing the transient identification.

10. The computer program product of claim 9, wherein the program instructions to receive the trigger to start processing the transient identification include at least one of program instructions to receive initiation of the processing from the user and program instructions to receive a trigger based on a contextual situation or scenario.

11. The computer program product of claim 8, the stored program instructions further comprising:
    responsive to determining the first set of identification artifacts is not the approved response to the request for the one or more identification artifacts, program instructions to determine a second set of identification artifacts; and
    program instructions to transmit the second set of identification artifacts to the requesting entity.

12. The computer program product of claim 8, wherein an identification artifact is a unique piece of information that is associated with the user and distinctly identifies the user.

13. The computer program product of claim 8, wherein the program instructions to determine the first set of identification artifacts comprise:
    program instructions to use a selection algorithm.

14. The computer program product of claim 13, wherein the selection algorithm is a Jaccard distance scoring function, and wherein the Jaccard distance scoring function is modified to match one or more defined constraints.

15. A computer system comprising:
    one or more computer processors;
    one or more computer readable storage devices;
    program instructions collectively stored on the one or more computer readable storage devices for execution by at least one of the one or more computer processors, the stored program instructions comprising:
    program instructions to receive a request for one or more identification artifacts associated with a user from a requesting entity;
    program instructions to determine a first set of identification artifacts;
    program instructions to transmit the first set of identification artifacts to the requesting entity, wherein the first set of identification artifacts is a list of one or more types of identification artifacts that meet the requirements of the request and satisfy a preference of the user;
    program instructions to determine whether the first set of identification artifacts is an approved response to the request for the one or more identification artifacts;
    responsive to determining the first set of identification artifacts is the approved response to the request for the one or more identification artifacts, program instructions to generate a transient identification of the user that includes the first set of identification artifacts; and
    program instructions to transmit the transient identification to the requesting entity.

16. The computer system of claim 15, the stored program instructions further comprising:
    program instructions to receive a trigger to start processing the transient identification.

17. The computer system of claim 16, wherein the program instructions to receive the trigger to start processing the transient identification include at least one of program instructions to receive initiation of the processing from the user and program instructions to receive a trigger based on a contextual situation or scenario.

18. The computer system of claim 15, the stored program instructions further comprising:
    responsive to determining the first set of identification artifacts is not the approved response to the request for the one or more identification artifacts, program instructions to determine a second set of identification artifacts; and
    program instructions to transmit the second set of identification artifacts to the requesting entity.

19. The computer system of claim 15, wherein an identification artifact is a unique piece of information that is associated with the user and distinctly identifies the user.

20. The computer system of claim 15, wherein the program instructions to determine the first set of identification artifacts comprise:
    program instructions to use a selection algorithm.

* * * * *